United States Patent
Styles et al.

(10) Patent No.: US 9,617,909 B2
(45) Date of Patent: Apr. 11, 2017

(54) METHOD AND SYSTEM FOR CHARGE AIR COOLER CONDENSATE CONTROL

(71) Applicant: Ford Global Technologies, LLC, Dearborn, MI (US)

(72) Inventors: Daniel Joseph Styles, Canton, MI (US); John Hoard, South Lyon, MI (US)

(73) Assignees: Ford Global Technologies, LLC, Dearborn, MI (US); The Regents of the University of Michigan, Ann Arbor, MI (US)

( * ) Notice: Subject to any disclaimer, the term of this patent is extended or adjusted under 35 U.S.C. 154(b) by 273 days.

(21) Appl. No.: 14/579,194

(22) Filed: Dec. 22, 2014

(65) Prior Publication Data

US 2016/0177813 A1    Jun. 23, 2016

(51) Int. Cl.
| | |
|---|---|
| F02B 29/00 | (2006.01) |
| F02B 29/04 | (2006.01) |
| F02M 35/10 | (2006.01) |
| F02D 41/00 | (2006.01) |
| F02P 5/15 | (2006.01) |
| F02P 15/08 | (2006.01) |

(52) U.S. Cl.
CPC ...... *F02B 29/0468* (2013.01); *F02B 29/0431* (2013.01); *F02D 41/0002* (2013.01); *F02D 41/005* (2013.01); *F02D 41/0007* (2013.01); *F02M 35/10393* (2013.01); *F02P 5/1502* (2013.01); *F02D 2041/001* (2013.01); *F02D 2041/0015* (2013.01); *F02D 2200/0418* (2013.01); *F02P 15/08* (2013.01)

(58) Field of Classification Search
CPC .................. F02B 29/0468; F02M 35/10393
USPC .................................................. 60/309, 311
See application file for complete search history.

(56) References Cited

U.S. PATENT DOCUMENTS

| | | | |
|---|---|---|---|
| 8,061,135 B2 | 11/2011 | Rutherford | |
| 8,511,072 B2 | 8/2013 | Judkins et al. | |
| 8,726,889 B2 | 5/2014 | Cockerill et al. | |
| 9,239,020 B2* | 1/2016 | Fulton | F02B 29/0468 |
| 9,476,345 B2* | 10/2016 | Styles | F01P 7/04 |
| 2002/0139127 A1* | 10/2002 | Kesten | B01D 53/268 62/93 |
| 2008/0190079 A1 | 8/2008 | Cerdes | |
| 2013/0276632 A1 | 10/2013 | Judkins et al. | |
| 2014/0109568 A1 | 4/2014 | Glugla et al. | |
| 2016/0061100 A1* | 3/2016 | Radmard | F02B 29/0468 60/599 |

* cited by examiner

*Primary Examiner* — Thomas Moulis
(74) *Attorney, Agent, or Firm* — Julia Voutyras; McCoy Russell LLP (57) ABSTRACT

Methods and systems are provided for controlling a condensate level in a charge air cooler. In one example, a method may include adjusting an air flow to a membrane in response to a condensate level in the charge air cooler.

20 Claims, 5 Drawing Sheets

METHOD AND SYSTEM FOR CHARGE AIR COOLER CONDENSATE CONTROL

FIELD

The present description relates generally to methods and systems for controlling a vehicle engine condensate level in a charge air cooler.

BACKGROUND/SUMMARY

Turbocharged and supercharged engines may be configured to compress ambient air entering the engine in order to increase power. Because compression of the air may cause an increase in temperature of the air, a charge air cooler may be utilized to cool the heated air thereby increasing its density and further increasing the potential power of the engine. If the humidity of the ambient air is high and or the engine is equipped with exhaust gas recirculation (EGR), however, condensation (e.g., water droplets) may form on any internal surface of the charge air cooler that is cooler than the dew point of the compressed air. During conditions such as a hard vehicle acceleration, these water droplets may be blown out of the charge air cooler and into the combustion chambers of the engine resulting in engine misfire, loss of torque and engine speed, and incompletely burned fuel, for example.

One approach for reducing the amount of condensation entering the combustion chambers is disclosed in US Patent Application Publication 2008/0190079. In the cited reference, a liquid trap for collecting condensation is placed in fluid communication with an air intake conduit downstream of the air cooler. The liquid trap may be coupled to a collection tank having a liquid level sensor which stores the collected condensation. The sensor may indicate when the water level becomes high and the collection tank needs to be emptied. Such a system may require a drain valve which may eventually stick closed or stick open causing a loss of boost pressure and subsequent loss of power to the engine. Such a system may also require the collection tank to be drained to the surroundings exterior to the vehicle. The condensation may contain regulated emissions, however, and draining the tank to the vehicle surroundings may not be an available option.

In one example, the issues described above may be addressed by a method comprising adjusting a drying air flow directed to a membrane in a charge air cooler in response to a condensate level in the charge air cooler. In this way, a charge air cooler condensate level may be maintained by applying a drying air flow to a membrane configured to selectively remove water. As one example, a drying air flow to a membrane may be increased in order to reduce a charge air cooler condensate level in order to prevent an engine cylinder misfire.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following figures represent a method and system for flowing a compressed gas mixture over a membrane positioned in a charge air cooler. The compressed gas mixture may deposit water (vapor or liquid) onto an inner portion of the membrane and the water may diffuse from the inner portion of the membrane to an outer portion of the membrane. A drying air flow may be directed to the outer portion of the membrane to draw water from the membrane to ambient air surrounding the charge air cooler.

The drying air flow may be provided by an air flow device. The air flow device may be adjusted in order to maintain a condensate level within the charge air cooler below a threshold level. As one example, the condensate level within the charge air cooler may be reduced in response to a decreasing engine combustion stability limit (e.g., decreasing likelihood of an engine misfire) by increasing the drying air flow rate. Methods and systems for controlling a charge air cooler condensate level are described below.

Figure 1:
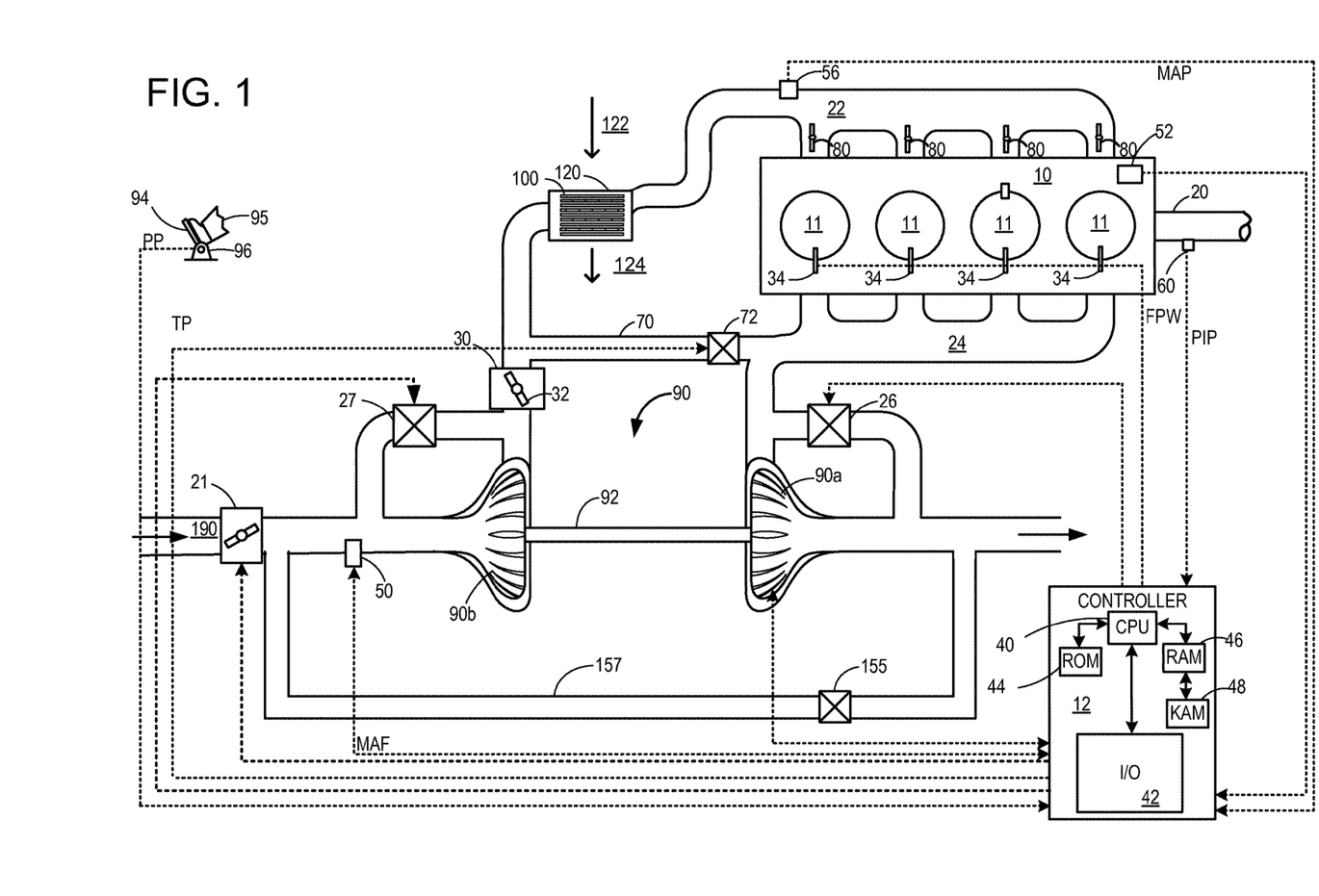
FIG. 1 illustrates an engine with a charge air cooler comprising membranes for maintaining a condensate level.

FIG. 1 shows an example of an engine system, for example, an engine system generally at 10. The engine system 10 may be a diesel engine, or a gasoline engine, or other type of engine that may utilize various components in accordance with the present disclosure. Specifically, internal combustion engine 10 comprises a plurality of cylinders 11. Engine 10 is controlled by electronic engine controller 12. Engine 10 includes a combustion chamber and cylinder walls with a piston positioned therein and connected to crankshaft 20. The combustion chamber communicates with an intake manifold 22 and an exhaust manifold 24 via respective intake and exhaust valves.

Charge motion control device (CMCD) 80 may be located upstream of the intake manifold 22. The CMCD 80 may restrict airflow to one or more of cylinders 11 for a variety of desired results, including but not limited to adjusting turbulence and burn rate. In the example of FIG. 1, each CMCD 80 may include a valve plate with a cut-out section. Other designs of the valve plate are possible. Note that for the purposes of this disclosure the CMCD is in the "closed" position when it is fully activated and the valve plate may be fully tilted into the respective conduit of intake manifold 190, thereby resulting in maximum air charge flow obstruction. Alternatively, the CMCD may be in the "open" position when deactivated and the valve plate may be fully rotated to lie substantially parallel with airflow (as depicted in FIG. 1), thereby considerably minimizing or eliminating airflow charge obstruction. The CMCD may principally be maintained in their "open" position and may only be activated "closed" when swirl conditions are desired. Each CMCD 80 may be adjusted via a rotating shaft to rotate the valve plate so that the valve plate is parallel to the flow direction when in the "open" position.

Intake manifold 22 communicates with throttle body 30 via throttle plate 32. In one embodiment, an electronically controlled throttle can be used. In some embodiments, the throttle is electronically controlled and adjustable to periodically, or continuously, maintain a specified vacuum level in intake manifold 22. While throttle body 30 is depicted as being downstream of a compressor device 90b, it will be appreciated that the throttle body may be placed upstream or downstream of the compressor. The choice may depend partly on the specific EGR system or systems that is/are used. Alternatively, or additionally, a throttle body 30 may be placed in the air induction tube upstream of the compressor or in the exhaust line to raise exhaust pressure. This may be effective in helping to drive EGR, but may not be effective by increasing total system cost and increasing the pumping work of the engine.

The combustion chamber is also shown having fuel injectors 34 coupled thereto for delivering fuel in proportion to the pulse width of signal (fpw) from controller 12. Fuel is delivered to the fuel injectors 34 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc. Additionally or alternatively, fuel may be injected in the intake ports of the cylinders.

In the depicted embodiment, controller 12 is a conventional microcomputer, and includes a microprocessor unit 40, input/output ports 42, electronic memory 44, which may be an electronically programmable memory in this particular example, random access memory 46, keep alive memory 48, and a conventional data bus.

Controller 12 may be configured to receive various signals from sensors coupled to engine 10, which may include but may not be limited to: measurements of inducted mass airflow (MAF) from mass airflow sensor 50; engine coolant temperature (ECT) from temperature sensor 52; manifold pressure (MAP) from manifold pressure sensor 56 coupled to intake manifold 22; a measurement of throttle position (TP) from a throttle position sensor (not shown) coupled to throttle plate 32; and a profile ignition pickup signal (PIP) from Hall effect sensor 60 coupled to crankshaft 20 indicating engine speed. In some examples, the controller 12 may adjust one or more of high pressure EGR valve 72, low pressure EGR valve 155, throttle 21, compressor recirculation valve 27, and/or wastegate 26 to achieve a desired EGR dilution percentage of the intake air.

Engine 10 may include an exhaust gas recirculation (EGR) system to help lower NOx and other emissions. For example, engine 10 may include a high pressure EGR system in which exhaust gas is delivered to intake manifold 22 by a high pressure EGR passage 70 communicating with exhaust manifold 24 at a location upstream of an exhaust turbine 90a of a compression device 90, and communicating with intake manifold 22 at a location downstream of an intake compressor 90b of the compression device 90. A high pressure EGR valve assembly 72 may be located in high pressure EGR passage 70. Exhaust gas may then travel from exhaust manifold 24 first through high pressure EGR passage 70, and then to intake manifold 22. The amount of EGR provided to the intake passage 190, upstream of throttle body 30 and downstream of charge air cooler 120, may be varied by the controller 12 via an EGR valve, such as high pressure EGR valve 72. An EGR cooler (not shown) may be included in high pressure EGR tube 70 to cool re-circulated exhaust gases before entering the intake manifold. Cooling may be done using engine coolant, but an air-to-exhaust gas heat exchanger may also be used.

FIG. 1 also shows a low pressure EGR system where EGR is routed from downstream of a turbine of a turbocharger to upstream of a compressor of a turbocharger through low pressure EGR passage 157. A low pressure EGR valve 155 may control the amount of EGR provided to the intake passage 190. In some embodiments, the engine may include both a high pressure EGR and a low pressure EGR system, as shown in FIG. 1. In other embodiments, the engine may include either a low pressure EGR system or a high pressure EGR system. When operable, the EGR system may increase the formation of condensate as it increases the water vapor concentration in the charge air, particularly when the charge air is cooled by the charge air cooler, as described in more detail below.

Further, drive pedal 94 is shown along with a driver's foot 95. Pedal position sensor (pps) 96 measures the angular position of the driver actuated pedal. Further, engine 10 may also include exhaust air/fuel ratio sensors (not shown). For example, either a 2-state EGO sensor or a linear UEGO sensor can be used. Either of these may be placed in the exhaust manifold 24, or downstream of the compression device 90.

Compression device 90 may be a turbocharger or any other such device. The depicted compression device 90 may have a turbine 90a coupled with the exhaust manifold 24 and a compressor 90b coupled with the intake manifold 22 via an intercooler 120 which may be an air-to-air heat exchanger, but could also be water cooled. Turbine 90a is typically coupled to compressor 90b via a drive shaft 92. The speed of turbine 90a may controlled via wastegate 26. A sequential turbocharger arrangement, single VGT, twin VGTs, or any other arrangement of turbochargers could be used and could include coolers within the compression device system, such as between two stages of compression.

An intake passage 190 may include an air intake control valve 21. Additionally, the intake passage 190 may include a compressor bypass or recirculation valve (CRV) 27 configured to divert intake air around the compressor 90b. The wastegate 26 and/or the CRV 27 may be controlled by the controller 12 to be opened when a lower boost pressure is desired, for example. For example, in response to compressor surge or a potential compressor surge event, the controller 12 may open the CRV 27 to decrease pressure at the outlet of the compressor 90b. This may reduce or stop compressor surge. Additionally or alternatively, the CRV 27 and/or the wastegate 26 may be opened to decrease a pressure in the charge air cooler and as a result, reduce condensate formation in the charge air cooler. The effect of pressure on condensation will be discussed in further detail below.

Further, the intake passage 190 may include a charge air cooler 120 (e.g., an intercooler) fluidically coupled to the compressor 90b and the engine 10. The compressor may be upstream of the charge air cooler to provide a compressed gas mixture to the charge air cooler. The charge air cooler may be used to decrease the temperature of the turbocharged or supercharged compressed gas mixture. The charge air cooler 120 may be an air-to-air cooler or a liquid-to-air cooler.

As explained above, condensate may accumulate in the charge air cooler and be swept to the engine, where it can cause combustion instability. As will be described in more detail below, the charge air cooler may include a membrane 100 to selectively transfer water vapor and/or condensate within the charge air cooler to outside of the charge air cooler without allowing charge air to leak from the charge air cooler.

The membrane 100 may be used to control condensate levels in the charge air cooler via capillary pores of varying diameter. The membrane may comprise an inner portion and an outer portion, wherein the inner portion comprises smaller capillary pores interacting with a compressed gas mixture and the outer portion, and the outer portion comprises larger capillary pores interacting with a drying air flow and the inner portion. The membrane 100 may have a relatively high water permeability, and be unaffected by compounds such as acids and particulates, as disclosed by U.S. Pat. No. 8,511,072. The membrane 100 may be constructed from stainless steel, alumina, and/or other corrosion resistant material.

The membrane 100 may be dried via a drying air flow shown by an incoming flow 122 and an outgoing flow 124. As a result, the drying air flow may dry the outer portion of membrane 100 through an evaporative action. The drying air flow may be provided to the charge air cooler via an air movement device in some examples. An air movement device may comprise one or more of a fan, an air pump, and an air duct positioned to direct ram air to the outer portion of the membrane. In some embodiments, the air duct may include a flow control valve. Additionally or alternatively, the fan and the air duct may exist together simultaneously, wherein they may be operated concurrently or sequentially.

Additionally or alternatively, the membrane 100 may be located in a low pressure EGR loop, in the pre-charge air cooler duct work, in the charge air cooler inlet tank, and/or other suitable location. In some examples, the membrane may be located in the charge air cooler replacing one or more heat exchanger finned cooling tubes included within the charge air cooler.

Thus, the system of FIG. 1 illustrates a charge air cooler configured to cool a compressed gas mixture in the charge air cooler. The charge air cooler includes a membrane over which the compressed gas mixture passes, depositing water vapor on an inner surface of the membrane. A drying air flow passes over an outer surface of the membrane and evaporates water from the membrane, without mixing with the compressed gas mixture.

Figure 2:
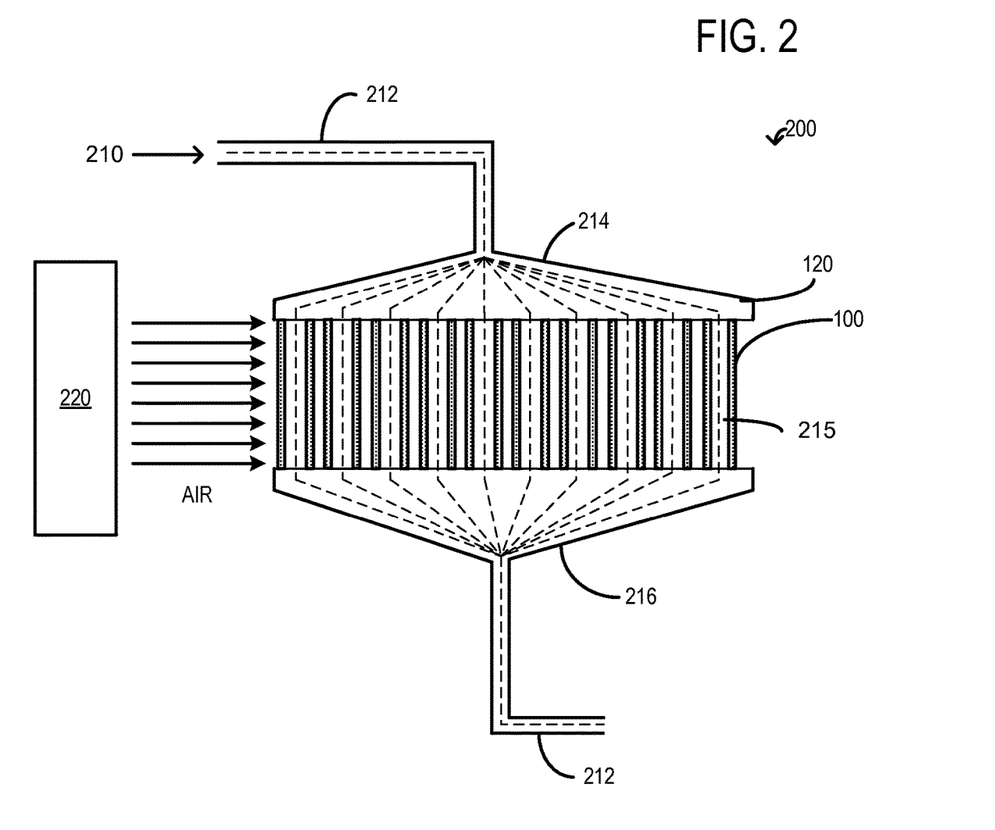
FIG. 2 depicts a detailed representation of the charge air cooler.

FIG. 2 includes system 200 illustrating a charge air cooler including one or more membranes, such as membrane 100, to manage condensate formation. The charge air cooler 120 may be used to cool compressed gas flowing downstream of a compressor (e.g., compressor 90b). Condensate may form in the charge air cooler 120 if a dew point within the cooler 120 is below a dew point of the compressed gas mixture. The membrane 100 may be used to separate water from the compressed gas mixture without permitting the compressed gas to escape through the membrane.

The compressed gas mixture 210 (e.g., including one or more of O2, CO2, N2, EGR, etc.), represented by dashed lines as it flows through the charge air cooler, may travel through a mixed gas stream passageway 212 (which may be the intake passage 190 of FIG. 1 in one example). The mixed gas stream pathway flows into a charge air cooler inlet tank 214, wherein the compressed gas mixture is able to spread across the length of the charge air cooler inlet tank which may be equal to the length of the charge air cooler 120. As depicted, the mixed gas stream passageway may divide into a plurality of passageways in the charge air cooler 120. One or more membranes (e.g., membrane 100) may be positioned within the charge air cooler to collect fluid (e.g., water) from the compressed gas mixture. In one example, a plurality of membranes may be interspersed along the mixed gas stream passageway 212. In another example, shown in FIG. 2, one or more of the cooling tubes 215 of the charge air cooler may be comprised of the membrane 100. In a further example, the membrane may be located in the charge air cooler inlet tank or other suitable location.

The compressed gas mixture flows through the charge air cooler 120 and passes over membrane(s) 100. An inner portion of membrane 100 absorbs water from the compressed gas mixture without absorbing the compressed gas mixture and an outer portion of membrane 100 expels the water to ambient, which may be expedited via a drying air flow provided by an air movement device 220. Water diffuses from the inner portion of the membrane to the outer portion of the membrane. The drying air flow and the compressed gas mixture do not mix, as membrane 100 maintains the ambient air outside the charge air cooler and the compressed gas mixture inside the charge air cooler separately. The air movement device 220 directs the drying air towards the charge air cooler. The drying air removes water from the outer surface of the membrane 100, without mixing with the compressed gas mixture.

Water diffusing from the outer portion of the membrane to the drying air may be based on two mechanisms. One mechanism is the diffusion of water from an area of higher concentration (e.g., the saturated membrane) to an area of lower concentration (e.g., the drying air flow). As the membrane becomes increasingly saturated with water, it is more likely to transfer the water to the drying air. The second mechanism is through pressure. A pressure within the charge air cooler is relatively high, and thus is typically higher than the pressure of the drying air flow. Therefore, the high pressure water in the membrane may be kinetically favored to diffuse to the low pressure drying air flow. The high pressure compressed gas mixture does not flow through the membrane and into the low pressure drying air due to the structure of the membrane, described in further detail below.

A drier compressed gas mixture may exit through an outlet tank 216, into the mixed gas stream passageway 212, and flow into the engine intake 22 (not shown). The drier compressed gas mixture comprises less water than the compressed gas mixture at the inlet of the charge air cooler, particularly when the drying air flow is directed towards the charge air cooler membranes. FIG. 2 is an illustration of a charge air cooler comprising a membrane that may manage condensate levels in the charge air cooler according to engine operating parameters. FIGS. 3A-D further illustrate the structure of the membrane along with the drying air flow source, placement, and mode of action.

Figure 3A:
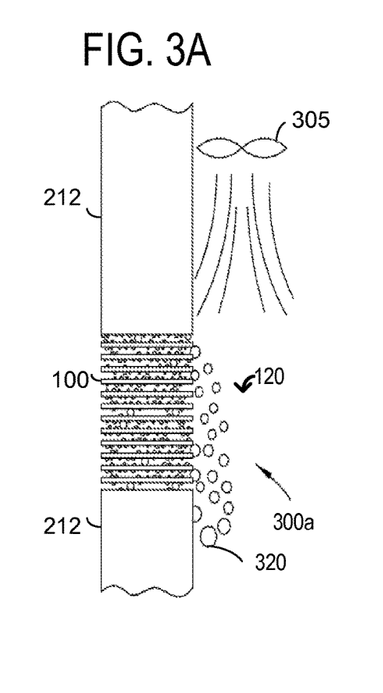
FIGS. 3A-3D depict various air delivery devices and/or angles used for drying the membrane along with a depiction of the inner and outer portions of the membrane.
Figure 3B:
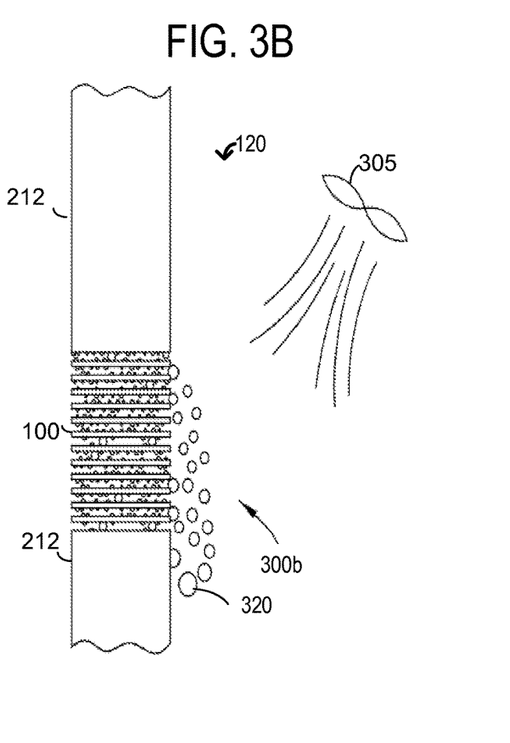
Figure 3C:
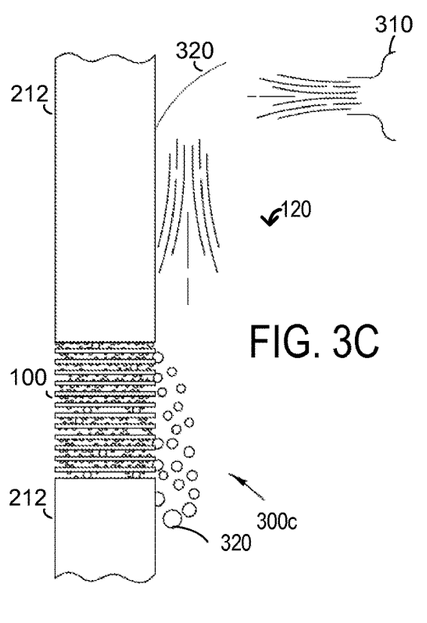
Figure 3D:
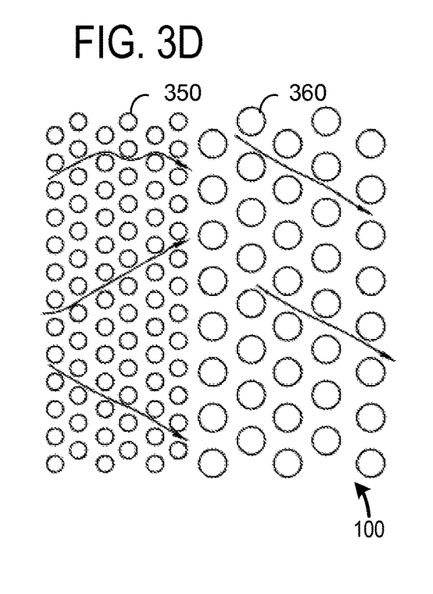

FIGS. 3A-D illustrate various air movement devices or air duct locations providing a drying air flow to the charge air cooler. FIG. 3D further illustrates the structure of the membrane. As mentioned above, an alternative embodiment may exist where the drying air flow may be provided by both the air movement device and the air duct. Further, embodiments may exist where the drying air flow may only be provided by the air movement device or the air duct.

FIGS. 3A and 3B illustrate respective systems 300a and 300b. Systems 300a and 300b depict an air movement device 305 (e.g., a fan or an air pump) positioned to direct drying air flow parallel and angled to a membrane, respectively. The membrane may be positioned in a charge air cooler (e.g., charge air cooler 120), or other suitable location. FIG. 3C shows system 300c illustrating an air duct 310 directing a drying air via a bend 320. The drying air flow through the air duct may be provided by ambient air (e.g., ram air). Additionally or alternatively, the air duct may include a control valve to control the drying air flow to the charge air cooler. As mentioned above, the air movement device 305 may be electrically operated. Further, the air movement device may be configured to adjust the angle at which the drying air flow impinges on the membrane, such as by adjusting the angle of the fan blades. Membrane 100 collects water from a compressed gas mixture as it flows through a mixed gas stream passageway 212. As the drying air flow is blown over the membrane, water molecules, represented by relatively large circles 320, diffuse from the membrane in the mixed gas stream pathway 212 to the drying air flow.

FIG. 3D represents a detailed view of the structure of membrane 100. Arrows depict the flow of water through the membrane and into the drying air flow (not shown). As a result, the compressed gas mixture may be to the left of the membrane and the drying air flow may be to the right of the membrane with respect to FIG. 3D. As the compressed gas mixture flows through a mixed gas stream passageway, water is absorbed onto the smaller capillary pores 350 of the membrane 100. The smaller capillary pores 350 of the membrane prevent the compressed gas mixture from flowing through the membrane. Water captured by the membrane moves toward the larger capillary pores 360 on the outer surface of the membrane. The smaller capillary pores 350 may have a diameter between 3 nm to 10 nm and the larger capillary pores 360 may have a diameter between 11 nm to 100 nm. Additionally or alternatively, the larger capillary pores 360 may have a diameter of 3 nm to 10 nm, however, the larger capillary pores 360 remain larger in diameter when compared to the smaller capillary pores 350. As the drying air flow passes over the membrane, the outer surface of the membrane is dried, therein enabling water to move from the inner surface to the outer surface. This action permits the inner surface of the membrane to further absorb water from the compressed gas mixture. The drying air flow need not be unidirectional to the movement of water in the membrane, but instead may be perpendicular, opposing, or a combination thereof (e.g., angled) to the direction of water movement in the membrane. Additionally or alternatively, the membrane may comprise of a material capable of selectively absorbing water and preventing a gas from flowing through the material. The water diffuses through the material to the outer surface (e.g., dry side) and evaporates upon interacting with a drying air flow.

Figure 4:
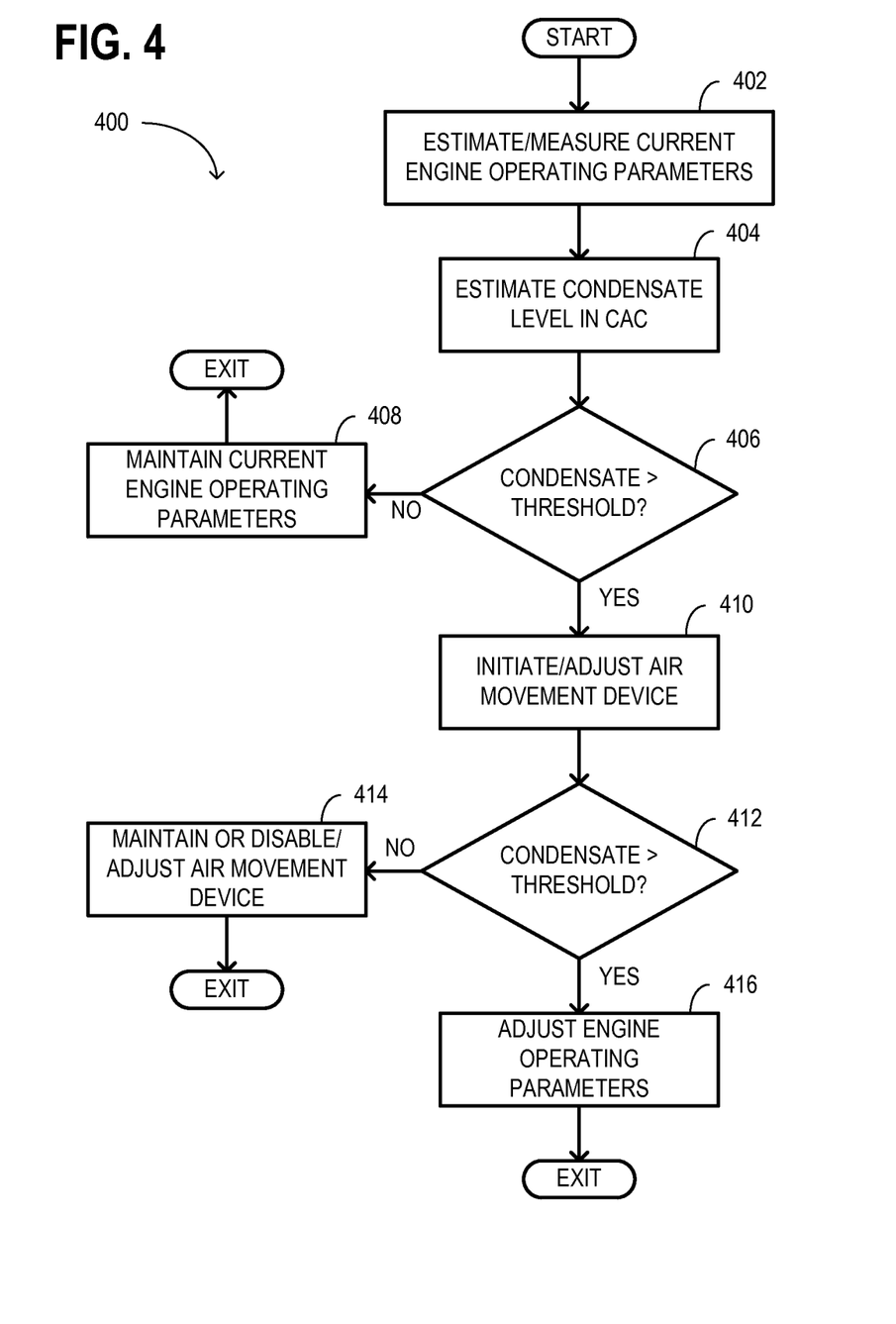
FIG. 4 illustrates a flow chart demonstrating a method for condensate control in a charge air cooler.

Thus, the membrane described above with respect to FIGS. 1-3D provides a mechanism to manage condensate levels in an engine component, such as a charge air cooler. In some examples, the condensate in the charge air cooler may be managed according to a combustion stability limit of an engine fluidically coupled to the charge air cooler. The combustion stability limit may represent the level of water vapor and/or condensate within the charge air inducted into the cylinders that the engine may tolerate without experiencing degraded combustion. The combustion stability limit may be exceeded if a condensate level in the charge air cooler is greater than a threshold condensation level and the condensate is swept into the engine, where it over-dilutes the combustion mixture in the cylinders. FIG. 4 describes a method for managing a level of condensate within the charge air cooler based on the combustion stability limit.

FIG. 4 is a flow chart illustrating an example method 400 for controlling a condensate level in a charge air cooler. During certain instances, the method may include adjusting a drying air flow to a charge air cooler membrane in order to maintain a condensate level according to a combustion stability limit.

Method 400 will be described herein with reference to components and systems depicted in FIGS. 1-2, particularly, regarding charge air cooler 120, membrane(s) 100, engine 10, air movement device 220, and compressor 90b. Method 400 may be carried out by a controller (e.g., controller 12) according to computer-readable media stored thereon. It should be understood that the method 400 may be applied to other systems of a different configuration without departing from the scope of this disclosure.

Method 400 may begin at 402, wherein engine operating conditions may be estimated and/or measured. The engine operating conditions may include, but are not limited to an engine speed, an engine load, an engine temperature, an EGR temperature and mass flow, a dilution demand, an air intake temperature and humidity, charge air cooler temperature, and a commanded air/fuel ratio. The dilution demand may be based on the current engine operating parameters (e.g., engine speed and/or engine load). The dilution demand may be additionally or alternatively determined based on a variety of factors, including but not limited to $NO_x$ formation, engine temperature, and air/fuel ratio. The engine dilution demand may also be determined by an optimal fuel economy for the engine.

At 404, a condensate level in the charge air cooler may be estimated based on air humidity, air temperature, EGR rate, EGR temperature, air/fuel ratio and/or a pressure in the charge air cooler. Condensate may form in the charge air cooler when a temperature of the charge air cooler is below a dew point temperature of a gas mixture flowing through the charge air cooler. Physical traits affecting the dew point of the gas mixture may include humidity, EGR rate and water vapor content, and pressure of the gas mixture. As the total water vapor concentration, and/or pressure increase, the dew point of the gas mixture increases, thereby increasing the likelihood of condensate formation in the charge air cooler. Determining the air humidity may include determining the air humidity based on signals from a humidity sensor located upstream of the charge air cooler in an air intake passage (e.g., intake passage 190). Likewise, determining the EGR water vapor content may include determining the EGR water vapor content based on signals determining the EGR rate and engine air-fuel ratio.

At 406, the method 400 includes determining if the estimated condensate formation in the charge air cooler is greater than a threshold condensate level. The threshold condensate level may be based on a combustion stability limit. As explained above, the combustion stability limit represents how much dilution (e.g., water vapor and/or condensate) may be ingested by the engine before knock, misfire, or other unstable combustion events occur. The combustion stability limit may be based on current operating parameters, including engine speed and load, EGR rate, and spark timing. Further, the combustion stability limit may be based on one or more of a degraded combustion and/or misfire potential for the current operating conditions. The threshold estimated condensate level may be correlated with the combustion stability limit, as the amount of condensate the engine is able to tolerate increases as the combustion stability limit increases. If the estimated condensate is greater than the threshold condensate level, then method 400 proceeds to 408 to maintain current engine operating parameters. The method may exit.

In some embodiments, the threshold condensate level may be adjusted proportionally to the combustion stability limit, wherein as the combustion stability limit increases, the threshold condensate level increases. The combustion stability limit may vary based on an engine dilution demand being satisfied. As the engine dilution demand is increasingly satisfied, the combustion stability limit may decrease.

Returning to 406, if it is determined that the estimated condensate formation in the charge air cooler is greater than the threshold condensate level, then the method proceeds to 410 activate or adjust an air movement device. As explained above, the air movement device may include a fan and/or an air pump. When the estimated condensate formation in the charge air cooler exceeds the threshold, the fan or air pump may be activated to direct a drying air flow to the one or more membranes of the charge air cooler. In some examples, if the fan or air pump is already activated, the far or air pump may be adjusted based on the estimated condensate formation. The air movement device adjustment may be based on a model or measurement. The model may include increasing a drying air flow from the air movement device to a maximum amount for a predetermined duration of time (e.g., setting a fan to 2000 rpm for 5 minutes). The measurement may include adjusting a drying air flow from the air movement device and a duration of operation based on the estimated condensate level in the charge air cooler, wherein as the estimated condensate level in the charge air cooler increases, the drying air flow from the air movement device and the duration of operation also increase. Upon initiating and/or adjusting the air movement device, the method 400 proceeds to 412 determine if a second estimated condensate level is greater than the threshold condensate level.

The second estimated condensate level may be estimated similar to examples discussed above. Additionally or alternatively, the second estimated condensate level may account for the adjustment in drying air flow from the initiated/adjusted air movement device. A drying amount between the drying air flow and the membrane(s) may be measured by a mass over time (e.g., kg/hr). The drying rate may be based on the drying air flow provided by the air movement device and the condensate level in the charge air cooler. Therefore, the second estimated condensate level may equal a difference between an estimated condensate forming in the charge air cooler and the rate of drying between the drying air flow and the membrane(s). For example, if an estimated condensate forming in a charge air cooler is 2 kg/hr and a rate of drying between a drying air flow and a membrane is 1.8 kg/hr, then the second estimated condensate level is 0.2 kg/hr.

If the second estimated condensate level is not greater than the threshold condensate level, then the method proceeds to 414 maintain or disable/adjust the air movement device. Maintaining the air movement device may be based on the drying rate between the drying air flow and the membrane(s) being a desired drying rate, wherein the desired drying rate may provide sufficient drying to reduce the condensate level in the charge air cooler to below the threshold condensate level. The air movement device may be disabled based on the condensate level in the charge air cooler being less than a lower threshold condensate level (e.g., lower than the threshold condensate level), which may be no estimated condensate in some examples.

Returning to 412, if the second estimated condensate level is greater than the threshold condensate level then the method may proceed to 416 adjust engine operating parameters, wherein the adjusting may include advancing the intake camshaft, increasing charge motion, adjusting spark, or disabling/reducing EGR. The controller may determine that a maximum drying rate between the drying air flow and the membrane(s) is not sufficient to reduce the condensate level in the charge air cooler to below the threshold condensate level. In other words, the rate of newly forming condensate is too high for the maximum drying rate to reduce to a condensate level below the threshold condensate level. As a result, the controller may adjust engine operating parameters including one or more of advancing the intake camshaft, increasing charge motion, adjusting spark, and reducing or disabling EGR (e.g., the EGR valves are moved to a partially or fully closed position). EGR and water vapor strongly affect flame speed and knocking Increased water content in a combustion mixture slows the flame speed and reduces knocking tendency. As a result, the controller may advance the intake camshaft, increase charge motion, and/or adjust spark in anticipation of condensate being blown to the engine to prevent engine knock and misfire. As an example, spark timing may be advanced proportionally to an amount of condensate, wherein as the amount of condensate increase, the spark timing advancement increases. Further, the controller may disable or reduce EGR to reduce condensate formation in the charge air cooler and/or decrease dilution of the charge air. Additionally or alternatively, advancing the intake camshaft, increasing charge motion, adjusting spark, and disabling or reducing EGR may be performed simultaneously. Further, the engine adjustments may include an ignition system adding re-strikes to reduce the possibility of misfire. The method may exit.

The method described above with respect to FIG. 4 provides a method for selectively routing a drying air flow to a charge air cooler membrane(s). Routing the drying air flow to the charge air cooler membrane(s) comprises initiating/adjusting an air movement device. The air movement device may be initiated/adjusted based on a condensate level in the charge air cooler. If an estimated condensate level with the charge air cooler exceeds a threshold condensate level, then a drying air flow supplied from the air movement device may be increased.

The method also provides for adjusting engine operating parameters when a maximum drying rate between the drying air flow and the membrane(s) does not reduce the condensate level in the charge air cooler to a level below the threshold condensate level. The adjusting may include advancing the intake cam, increasing charge motion, adjusting spark, reducing/disabling EGR, or a combination thereof.

Figure 5:
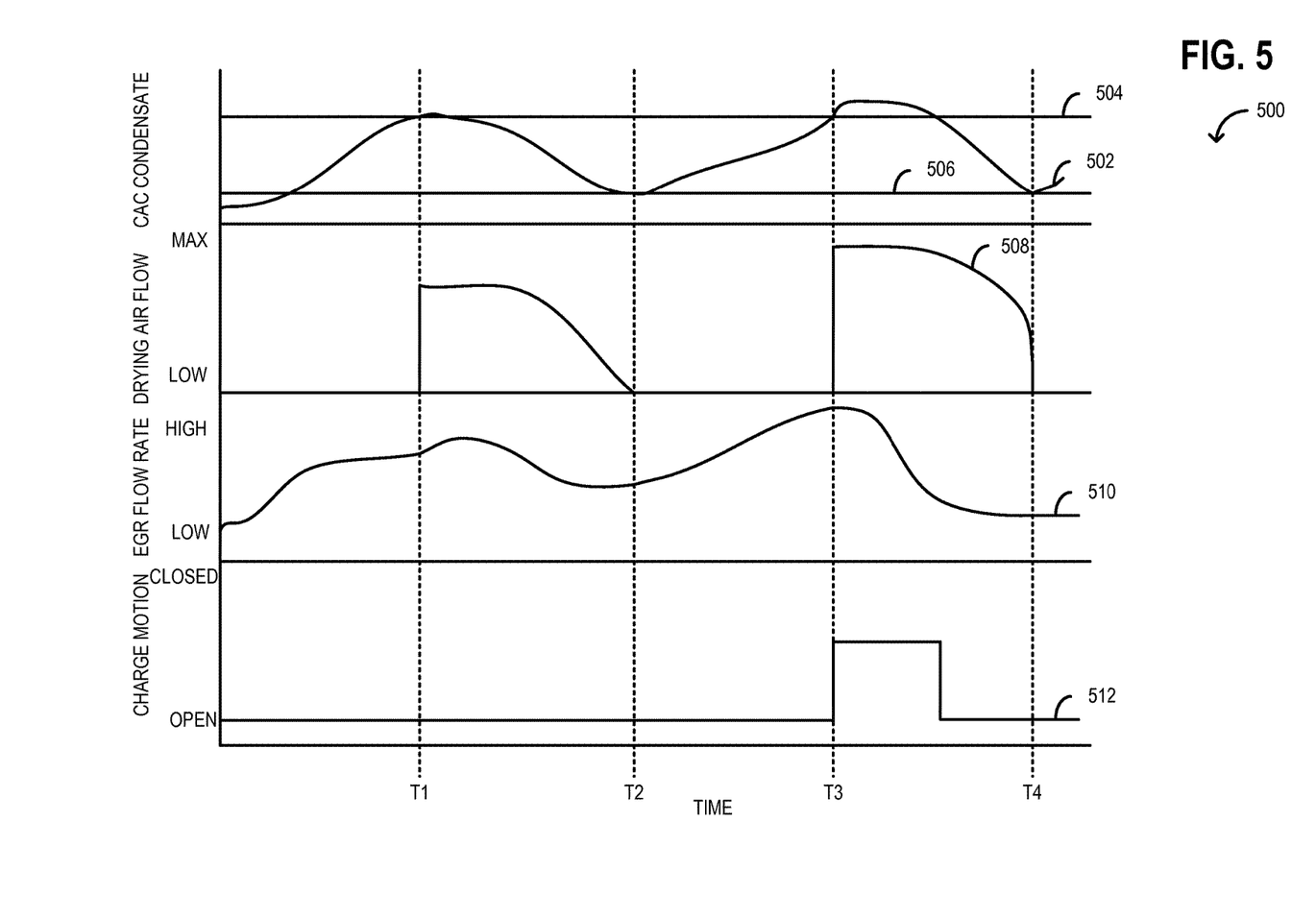
FIG. 5 depicts a plot illustrating instances for initiating a drying air flow to dry the charge air cooler membrane.

Now turning to FIG. 5, plot 500 illustrates a variety of engine conditions and their effects on one another as engine operating conditions change. The x-axis represents time and the y-axis represents the respective engine condition being measured. Graph 502 represents a charge air cooler condensate with lines 504 and 506 respectively representing a threshold condensate level and a lower threshold condensate level, graph 508 represents a drying air flow, graph 510 represents an EGR flow rate, and graph 512 represents a charge motion, for example.

Plot 500 will be described herein with reference to components and systems depicted in FIG. 1, particularly, membrane 100, charge air cooler 120, and engine 10. Plot 500 may be measured by a controller (e.g., controller 12) according to computer-readable media stored thereon.

Prior to T1, the charge air cooler condensate increases as the EGR flow rate increases, as shown by graphs 502 and 510 respectively. Charge motion control device is at a commanded position for the operating conditions, such as maximum opening for lowest pumping and the drying air flow remains disabled, as shown by graphs 512 and 508 respectively. At T1, the condensate level in the charge air cooler exceeds the threshold condensate level. Accordingly, the air movement device is initiated (e.g., a fan is turned on) and a drying air flow is directed towards the charge air cooler membrane(s). Charge motion control device remains open and the EGR flow rate continues to increase.

After T1 and prior to T2, the drying air flow is relatively high and is able to reduce the charge air cooler condensate level to an amount below the threshold condensate level despite the increasing EGR flow rate. As the drying air flow begins to decrease, the condensate level approaches the lower threshold condensate level and the drying air flow decreases (e.g. a fan speed decreases). The lower threshold condensate level may represent an amount of condensate that the engine is able to ingest under current operating conditions without causing combustion instability, and as such the controller may signal to disable or adjust the drying air flow when the lower threshold condensate level is reached. The EGR flow rate continues to fluctuate. The charge motion control device remains open due to the air movement device reducing the charge air cooler condensate level to a level below the threshold condensate level independent of an engine operating parameter adjustment.

At T2, the air movement device is disabled. In some examples, the air movement device may be maintained or adjusted, as described above. The charge air cooler condensate level has decreased below the lower threshold condensate level. The EGR flow rate begins to increase. The EGR flow rate may begin to increase due to an increase in engine load. Charge motion control device remains open. After T2 and prior to T3, the charge air cooler condensate level increases, possibly due to the increase in the EGR flow rate. Spark timing remains open and the drying air flow is disabled.

At T3, the charge air cooler condensate level exceeds the threshold condensate level and as a result, the air movement device supplies a drying air flow. After T3 and prior to T4, the charge motion control device is activated (e.g., charge motion control device 80 is closed) in response to a rate of drying between the maximum drying air flow and the membrane(s) not drying the condensate level to a level below the threshold condensate level. Additionally, the EGR flow rate is reduced to decrease a rate of condensate formation in the charge air cooler and allow the membrane(s) to dry. The length of time the charge motion control device is activated may be equal to the length of time the charge air cooler condensate level remains above the threshold condensate level, wherein the charge motion control device returns to an open position simultaneous to the charge air cooler condensate level decreasing to a level below the threshold condensate level.

At T4, the charge air cooler condensate level reaches the lower threshold condensate level and as a result, the air movement device is disabled. Charge motion control device remains open and the EGR flow rate is constant. After T4, the charge air cooler condensate level increases due to the air movement device being disabled. The EGR flow rate is constant and the charge motion control device is open.

FIG. 5 provides an illustration for the method described above with respect to FIG. 4. In this way, a membrane placed in a charge air cooler coupled with an air movement device may control a condensate level in the charge air cooler. A drying air flow provided by the air movement device may be adjusted based on an engine combustion stability limit. By doing this, the condensate level may be maintained to prevent engine combustion degradation and/or an engine misfire. One or more engine operating parameters may be maintained so long as the air movement device is able to maintain the charge air cooler condensate level at a level below a threshold condensate level. Additionally or alternatively, the engine operating parameters may be adjusted in response to the air movement device being unable to maintain the charge air cooler condensate level at a level below the threshold condensate level. The adjustments may include advancing intake cam timing, increasing charge motion, adjusting spark, and reducing or disabling an EGR flow rate. In some examples, the adjustments may be done concurrently (as shown) or separately (not shown).

The technical effect of incorporating a membrane in a charge air cooler is to provide an engine with greater control over condensate levels within an intake system. The membrane(s) in the charge air cooler may be used to maintain a condensation level in the charge air cooler to meet a combustion stability limit.

In an embodiment, method for an engine comprises adjusting a drying air flow directed to a membrane in a charge air cooler in response to a condensate level in the charge air cooler. Additionally or alternatively, the threshold is based on a combustion stability limit of the engine. The method, additionally or alternatively, may further include adjusting the threshold based on the combustion stability limit, wherein the adjusting includes decreasing the threshold as an engine dilution demand is met. The method, additionally or alternatively, may include increasing the drying air flow in response to a condensate level greater than a threshold condensate level, decreasing the drying air flow in response to a condensate level less than the threshold condensate level.

The method, additionally or alternatively, may further include cooling a compressed gas mixture in the charge air cooler, the compressed gas mixture passing over the membrane and depositing water vapor on an inner surface of the membrane, and wherein the drying air flow passes over an outer surface of the membrane and evaporates water from the membrane, without mixing with the compressed gas mixture. Additionally or alternatively, the adjusting includes increasing the drying air flow in response to a combustion stability limit decrease.

An embodiment of a system comprises a charge air cooler upstream of an engine and a membrane separating a charge air path from an exterior of the charge air cooler, a plurality of smaller capillary pores through an inner portion of the membrane in fluid communication with the charge air path, and a plurality of larger capillary pores through an outer portion of the membrane in fluid communication with the exterior of the charge air cooler. The system, additionally or alternatively, may include a compressor upstream of the charge air cooler to provide a compressed gas mixture to the charge air path and an air movement device supplying a drying air flow to the outer portion of the membrane. The air movement device may comprise one or more of a fan, an air pump, and an air duct positioned to direct ram air to the outer portion of the membrane. Additionally or alternatively, the system may include an intake passage fluidically coupling the compressor, the charge air cooler, and the engine. The system may further include a controller with computer-readable instructions for adjusting the air movement device in response to a desired drying rate of the membrane.

The system, additionally or alternatively, may further include that the inner portion of the membrane absorbs water from a compressed gas mixture without absorbing gas from the compressed gas mixture, the water diffuses from the inner portion to the outer portion of the membrane, and the drying air flow evaporates the water from the outer portion of the membrane, without mixing with the compressed gas mixture. The plurality of smaller capillary pores may have a diameter between 3 nm to 10 nm and the larger capillary pores have a diameter between 11 nm to 100 nm. The charge air cooler may comprise a plurality of cooling tubes defining the charge air path, and wherein one or more of the cooling tubes is comprised of the membrane.

Another method for an engine comprises flowing a compressed gas mixture over a membrane positioned in a charge air cooler, the compressed gas mixture depositing water onto an inner portion of the membrane, the water diffusing from the inner portion of the membrane to an outer portion of the membrane, and directing a drying air flow to the outer portion of the membrane to draw water from the membrane to ambient air surrounding the charge air cooler. The method may further include directing the drying air flow comprises directing the drying air flow via one or more of a fan, an air pump, and an air duct.

The method, additionally or alternatively, may include adjusting a drying air flow rate, wherein the adjusting includes increasing the drying air flow rate responsive to an estimated condensate level in the charge air cooler exceeding a threshold condensate level, the threshold condensate level based on a misfire potential of one or more cylinders of the engine. The method may further include adjusting one or more engine operating parameters in response to the condensate level in the charge air cooler exceeding the threshold condensate level even after the drying air flow rate is increased. The method may further include adjusting the one or more engine operating parameters comprises adjusting one or more of an EGR flow rate, intake cam advance and charge motion level, and spark timing.

In an embodiment, method for an engine comprises adjusting a drying air flow directed to a membrane in response to a condensate level in a charge air cooler. The method, additionally or alternatively, may include a threshold based on a combustion stability limit of the engine, wherein adjusting the threshold based on the combustion stability limit, wherein the adjusting includes decreasing the threshold as an engine dilution demand is met. The adjusting may include increasing the drying air flow in response to a condensate level greater than a threshold condensate level, decreasing the drying air flow in response to a condensate level less than the threshold condensate level. Additionally or alternatively, the method may include the charge air cooler comprising cooling passages lined with the membrane, the charge air cooler cooling a compressed gas mixture, the compressed gas mixture passing over the membrane and depositing water vapor on an inner surface of the membrane, and wherein the drying air flow passes over an outer surface of the membrane and evaporates water from the membrane, without mixing with the compressed gas mixture. The adjusting may include increasing the drying air flow in response to a combustion stability limit decrease. Additionally or alternatively, the method may include estimating the condensate level based on an air humidity sensor measurement and an estimate of water vapor concentration contributed by EGR based on air fuel ratio and EGR rate of one or more of an intake air and an EGR flow.

In an embodiment, a system of an engine comprising a charge air cooler upstream of the engine, a membrane separating a charge air path from an exterior of the charge air cooler, a plurality of smaller capillary pores through an inner portion of the membrane in fluid communication with the charge air path, and a plurality of larger capillary pores through an outer portion of the membrane in fluid communication with the exterior of the charge air cooler. The system, additionally or alternatively, may include a compressor upstream of the charge air cooler to provide a compressed gas mixture to the charge air path and an air movement device supplying a drying air flow to the outer portion of the membrane, wherein an intake passage fluidically couples the compressor, the charge air cooler, and the engine.

Additionally or alternatively, the system may include the air movement device comprising one or more of a fan, an air pump, and an air duct positioned to direct ram air to the outer portion of the membrane. The system may further include a controller with computer-readable instructions for adjusting the air movement device in response to a desired drying rate of the membrane. The system, additionally or alternatively, may include the inner portion of the membrane absorbing water from a compressed gas mixture without absorbing gas from the compressed gas mixture, the water diffusing from the inner portion to the outer portion of the membrane, and the drying air flow evaporating the water from the outer portion of the membrane, without mixing with the compressed gas mixture. The system may further include the plurality of smaller capillary pores have a diameter between 3 nm to 10 nm and the larger capillary pores have a diameter between 11 nm to 100 nm. Additionally or alternatively, the system may include the charge air cooler comprising a plurality of cooling tubes defining the charge air path, and wherein one or more of the cooling tubes comprises the membrane Another method for an engine comprises flowing a compressed gas mixture over a membrane positioned in a charge air cooler, the compressed gas mixture depositing water onto an inner portion of the membrane, the water diffusing from the inner portion of the membrane to an outer portion of the membrane, and directing a drying air flow to the outer portion of the membrane to draw water from the membrane to ambient air surrounding the charge air cooler. Additionally or alternatively, the method may further include directing the drying air flow comprises directing the drying air flow via one or more of a fan, an air pump, and an air duct.

The method, additionally or alternatively, may further include adjusting a drying air flow rate, wherein the adjusting includes increasing the drying air flow rate responsive to an estimated condensate level in the charge air cooler exceeding a threshold condensate level, the threshold condensate level based on a misfire potential of one or more cylinders of the engine. Additionally or alternatively, the method may comprise adjusting one or more engine operating parameters in response to the condensate level in the charge air cooler exceeding the threshold condensate level even after the drying air flow rate is increased. The adjusting may include adjusting the one or more engine operating parameters comprises adjusting one or more of an EGR flow rate, cam timing, charge motion level, and spark timing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising;
   adjusting a drying air flow directed to a membrane in response to a condensate level in a charge air cooler.

2. The method of claim 1, further comprising a threshold based on a combustion stability limit of the engine.

3. The method of claim 2, further comprising adjusting the threshold based on the combustion stability limit, wherein the adjusting includes decreasing the threshold as an engine dilution demand is met.

4. The method of claim 3, wherein the adjusting includes increasing the drying air flow in response to a condensate level greater than a threshold condensate level, decreasing the drying air flow in response to a condensate level less than the threshold condensate level.

5. The method of claim 1, wherein the charge air cooler comprises cooling passages lined with the membrane, the charge air cooler cooling a compressed gas mixture, the compressed gas mixture passing over the membrane and depositing water vapor on an inner surface of the membrane, and wherein the drying air flow passes over an outer surface of the membrane and evaporates water from the membrane, without mixing with the compressed gas mixture.

6. The method of claim 5, wherein the adjusting includes increasing the drying air flow in response to a combustion stability limit decrease.

7. The method of claim 1, further comprising estimating the condensate level based on an air humidity sensor measurement and an estimate of water vapor concentration contributed by EGR based on air fuel ratio and EGR rate of one or more of an intake air and an EGR flow.

8. A system, comprising:
   a charge air cooler upstream of an engine; and
   a membrane separating a charge air path from an exterior of the charge air cooler, a plurality of smaller capillary pores through an inner portion of the membrane in fluid communication with the charge air path, and a plurality of larger capillary pores through an outer portion of the membrane in fluid communication with the exterior of the charge air cooler.

9. The system of claim 8, further comprising a compressor upstream of the charge air cooler to provide a compressed gas mixture to the charge air path and an air movement device supplying a drying air flow to the outer portion of the membrane.

10. The system of claim 9, where an intake passage fluidically couples the compressor, the charge air cooler, and the engine.

11. The system of claim 10, wherein the air movement device comprises one or more of:
    a fan, an air pump, and an air duct positioned to direct ram air to the outer portion of the membrane.

12. The system of claim 11, further comprising a controller with computer-readable instructions for adjusting the air movement device in response to a desired drying rate of the membrane.

13. The system of claim 8, wherein the inner portion of the membrane absorbs water from a compressed gas mixture without absorbing gas from the compressed gas mixture, the water diffuses from the inner portion to the outer portion of the membrane, and the drying air flow evaporates the water from the outer portion of the membrane, without mixing with the compressed gas mixture.

14. The system of claim 8, wherein the plurality of smaller capillary pores have a diameter between 3 nm to 10 nm and the larger capillary pores have a diameter between 11 nm to 100 nm.

15. The system of claim 8, wherein the charge air cooler comprises a plurality of cooling tubes defining the charge air path, and wherein one or more of the cooling tubes is comprised of the membrane.

16. A method for an engine, comprising;
    flowing a compressed gas mixture over a membrane positioned in a charge air cooler, the compressed gas mixture depositing water onto an inner portion of the membrane, the water diffusing from the inner portion of the membrane to an outer portion of the membrane; and
    directing a drying air flow to the outer portion of the membrane to draw water from the membrane to ambient air surrounding the charge air cooler.

17. The method of claim 16, wherein directing the drying air flow comprises directing the drying air flow via one or more of a fan, an air pump, and an air duct.

18. The method of claim 16, further comprising adjusting a drying air flow rate, wherein the adjusting includes increasing the drying air flow rate responsive to an estimated condensate level in the charge air cooler exceeding a threshold condensate level, the threshold condensate level based on a misfire potential of one or more cylinders of the engine.

19. The method of claim 18, further comprising adjusting one or more engine operating parameters in response to the condensate level in the charge air cooler exceeding the threshold condensate level even after the drying air flow rate is increased.

20. The method of claim 19, wherein adjusting the one or more engine operating parameters comprises adjusting one or more of an EGR flow rate, cam timing, charge motion level, and spark timing.

* * * * *